(12) United States Patent
Benner et al.

(10) Patent No.: US 7,876,751 B2
(45) Date of Patent: Jan. 25, 2011

(54) RELIABLE LINK LAYER PACKET RETRY

(75) Inventors: Alan F. Benner, Poughkeepsie, NY (US); David Craddock, New Paltz, NY (US); Thomas A. Gregg, Highland, NY (US)

(73) Assignee: International Business Machines Corporation, Armonk, NY (US)

( * ) Notice: Subject to any disclaimer, the term of this patent is extended or adjusted under 35 U.S.C. 154(b) by 359 days.

(21) Appl. No.: 12/035,067

(22) Filed: Feb. 21, 2008

(65) Prior Publication Data

US 2009/0213861 A1 Aug. 27, 2009

(51) Int. Cl.
*H04L 12/28* (2006.01)
*H04L 12/56* (2006.01)

(52) U.S. Cl. ...................... 370/389; 370/392
(58) Field of Classification Search ............... None
See application file for complete search history.

(56) References Cited

U.S. PATENT DOCUMENTS

| | | | |
|---|---|---|---|
| 4,999,829 A | 3/1991 | Fite, Jr. et al. | |
| 6,434,149 B1 | 8/2002 | Jackson et al. | |
| 6,535,489 B1 | 3/2003 | Merchant et al. | |
| 6,757,242 B1 | 6/2004 | Wang et al. | |
| 6,766,464 B2 | 7/2004 | Collier | |
| 6,792,604 B1 | 9/2004 | Hickson et al. | |
| 6,904,018 B2 | 6/2005 | Lee et al. | |
| 6,999,459 B1 | 2/2006 | Callon et al. | |
| 7,069,392 B2 | 6/2006 | Kota et al. | |
| 2005/0117517 A1 | 6/2005 | DeCusatis et al. | |
| 2005/0259687 A1* | 11/2005 | Abrol et al. | 370/469 |
| 2006/0133378 A1* | 6/2006 | Patel | 370/394 |
| 2006/0171396 A1* | 8/2006 | Singh et al. | 370/394 |
| 2009/0086735 A1* | 4/2009 | Tsang | 370/394 |

OTHER PUBLICATIONS

Nabil Seddigh, "Studies of TCP's Retransmission Timeout Mechanism", IEEE Conference on Communications, vol. 6. pp. 1834-1840.

* cited by examiner

*Primary Examiner*—Chirag G Shah
*Assistant Examiner*—Minh-Trang Nguyen
(74) *Attorney, Agent, or Firm*—Steven Chiu

(57) ABSTRACT

Communication over a computer network with a node having a first port with a point-to-point link connection to a second node having a second port. The first port transmits to the second port a reliable link layer (RLL) packet over the link. The RLL packet comprises a first RLL header and a first data packet, the first RLL header preceding the first data packet, the first RLL header comprising an RLL start-of-frame (SOF) character and an RLL packet sequence number (PSN). If the first port receives an RLL acknowledgment control packet from the link, it acknowledges receipt of the first data packet, and the first port does not retain the first data packet in the buffer. If the first port does not receive the RLL acknowledgment packet from the link, acknowledging receipt of the first data packet, the first port re-transmits from the buffer the first data packet.

19 Claims, 7 Drawing Sheets

| SYMBOL | ENCODING | DESCRIPTION |
|---|---|---|
| COM | K28.5 | COMMA, CHARACTER BOUNDARY ALIGNMENT SYMBOL |
| SDP | K27.7 | START OF DATA PACKET DELIMITER |
| SLP | K28.2 | START OF LINK PACKET DELIMITER |
| EGP | K29.7 | END OF GOOD PACKET DELIMITER |
| EBP | K30.7 | END OF BAD PACKET DELIMITER |
| PAD | K23.7 | PACKET PADDING SYMBOL |
| SKP | K28.0 | SKIP SYMBOL |
| | K28.1<br>K28.7 | RESERVED CONTROL SYMBOLS<br>THESE SYMBOLS HAVE "COMMA" CHARACTERISTICS |
| | K28.3<br>K28.4 | RESERVED CONTROL SYMBOLS |
| | K28.8 | VENDOR SPECIFIC CONTROL SYMBOL |

FIG.5

RELIABLE LINK LAYER PACKET RETRY

BACKGROUND OF THE INVENTION

The present application pertains to communications over networks. In particular, the present application pertains to increasing the reliability of packet transmission over InfiniBand® networks, thereby providing greater network bandwidth because less overhead is required for error handling.

InfiniBand® is a trademark of the InfiniBand® Trade Association. InfiniBand® networks typically rely on end nodes, i.e., source and destination nodes, to handle reliability and error issues such as error checking, time outs, and acknowledgments. All the links which connect a source end node to a destination end node are assumed to be operational at an acceptable level of reliability. End nodes may be either sources or destinations and usually operate as both. Links can be comprised of optical fiber, coaxial cable, copper wire, and other media which can experience bit errors on the line caused by noise or static for example. Such errors must be addressed for data transmissions to be accurate and useful. Currently, InfiniBand® uses an end to end protocol for each packet preferably comprising an error checking protocol. If a received packet error is detected, a receiver can request that a sender resend the packet, or a receiver can withhold an acknowledgment until the sender's clock times out and the sender determines to resend the packet. Many other well known policies, protocols, and techniques can be employed for repeating transmission of erroneous packets.

Large networks typically require more switches than small networks, each with multiple ports. The larger the network, the higher the number of links that a packet typically traverses, often referred to as "hops", from a sending node to a receiving node and the higher the probability that a link bit error will occur. There may be different paths between sender and receiver with each path comprising multiple links. If a problem in a transmission is detected, it can be difficult to determine which link might be having a problem transmitting packets from the perspective of a receiving node or of a sending node. Thousands of nodes may be coupled through the network between a sending node and a receiving node, and the error handling for an erroneous transmission might consume unnecessary bandwidth if it is undertaken from one end to another through the entire network path. For example, a single bit error on one link typically will require retransmission of an entire packet over all the links comprising the network path from sender to receiver. Timeout periods can become prolonged in large networks due to local switch or fabric congestion. If the time out period is too short, it can further increase congestion due to needless resending of packets (that may be in transit, or wherein another copy is in transit). On the other hand, long timeout periods reduce throughput and increase recovery time.

Network data transmission typically comprises a number of procedures to verify the status of packets that are transmitted from senders to receivers. Senders, or sources, of data packets must know whether the data packets have arrived without error at receivers, or destinations. Packets can be broadcast to all receivers capable of receiving packets from a particular sender, they may be multicast to a subset of all potential receivers, or they may be sent point-to-point to one target destination. Embodiments of the present invention are discussed herein with respect to InfiniBand® point-to-point data transmission, however, many aspects of the present invention can be applied to other protocols, types, and formats of data transmission.

Packets that are transmitted over a network typically are stored at the sending device until confirmation of receipt is obtained from the receiving device, because retransmission might be required in the event that the transmitted packet contains a bit error. Acknowledgment of a received packet by the receiver (referred to as an "ACK" returned to a sender) is performed using any of a variety of protocols designed to indicate an error free receipt of individual packets or groups of packets. Packet identification is accomplished via numerical identifiers typically assigned to packets sequentially and preferably stored in a packet's header. A sender purges stored packets that have been acknowledged as error free by a receiving device.

A packet transmission failure can occur in several different ways. For example, a sender might not receive an ACK within some pre-selected time out period. The sender can then resend one or a series of unacknowledged packets. As another example, an ACK packet might have been sent by a receiver but not received by the sender, either because of a network failure or because the ACK is still in transit for example. As another example, a missing sequence number out of multiple received packets can result in the receiver requesting that the missing packet corresponding to the missing sequence number be resent, or that all packets beginning with the missing packet sequence number be resent. In general, an erroneous packet is always eventually discarded at a receiving device because a receiver does not have sufficient information to correct erroneous packet data.

BRIEF SUMMARY OF THE INVENTION

The present application facilitates reduction of the effects of link errors on each link of a communication network path rather than undertaking a conventional end to end check. In one embodiment, the present application provides techniques for automatically retransmitting packets at the link level when an error occurs. The techniques include communicating over a computer network having a first port with a point-to-point link connection to a second port. The first port transmits to the second port a reliable link layer (RLL) packet over the link. The RLL packet comprises a first RLL header and a first data packet, the first RLL header preceding the first data packet, the first RLL header comprising an RLL start-of-frame (SOF) character and an RLL packet sequence number (PSN). If the first port receives an RLL acknowledgment control packet from the link, it acknowledges receipt of the first data packet, and the first port does not retain the first data packet in the buffer. If the first port does not receive the RLL acknowledgment packet from the link, acknowledging receipt of the first data packet, the first port re-transmits from the buffer the first data packet.

The present application is directed to reducing the effects of link errors on each link rather than undertaking an end to end post mortem in its entirety. One advantage of the presently disclosed approach is that a source end node is not sending messages to many destination end node, from the perspective of a single link, because there is only one source end node and one destination end node on each link, providing easy record keeping and quick recovery. Each link can thus be managed effectively error free from the perspective of the end nodes. For example, each link can be made more reliable by using a retry function. If a packet is corrupted while traversing a link then the receiver on that link can notify the sender, via a timeout or a NAK, and the sender can then retransmit the packet on that link. The sender can avoid end-to-end premature time outs because the time out periods can be dramatically increased and false retries minimized.

The present invention may be selectively implemented on individual links depending on a variety of factors. On a single link, some of the transmitted data can be retried while others are not retried. For example, computer data, which must be transmitted intact, may use features of the present invention, while real-time video streams, or voice data, which have higher tolerance for errors, may be simultaneously transmitted over the same links without using these features. The links can use any presently implemented media, such as passive copper, optical, or active copper, or other media such as wireless.

In one embodiment, RLL packets are associated with Service Levels (SLs) which identify a priority level of a packet. The service levels can then be mapped onto Virtual Lanes ("VLs") which implement their own particular buffering protocols. RLL logic may be selectively applied for one type of service level and not another. The hardware monitors SLs to determine whether to apply a particular RLL protocol for a particular packet.

By adding a link layer retry capability to each individual link, reliability is improved without requiring typical end-to-end retry mechanisms. Thus, end-to-end timeouts may be dramatically decreased as well as false retries due to fabric congestion. Implementation of the present RLL protocols to links is applied in a fashion so as not to impact non-reliable traffic (on other service levels), VL buffering, end-to-end protocols, or other currently running protocols on the network. It can also be used on networks implementing older hardware.

These, and other, aspects and objects of the present invention will be better appreciated and understood when considered in conjunction with the following description and the accompanying drawings. It should be understood, however, that the following description, while indicating preferred embodiments of the present invention and numerous specific details thereof, is given by way of illustration and not of limitation. Many changes and modifications may be made within the scope of the present invention without departing from the spirit thereof, and the invention includes all such modifications.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 5 is a table listing several defined K Characters including undefined characters in accordance with an embodiment of the present invention;

DETAILED DESCRIPTION OF THE INVENTION

The present application facilitates reduction of error rates on each link of a communication network path rather than undertaking a conventional end to end check. The larger the network, the higher the number of links that a packet may traverse from a sending node to a receiving node. In such a circumstance, there may be different paths between sender and receiver with each comprising multiple links. If a problem in a transmission is detected, it can be difficult to determine which link might be having a problem transmitting packets from the perspective of a receiving node or of a sending node. A single bit error on one link typically will require retransmission of an entire packet over all the links from end to end. If monitored individually, each link can be managed error free, effectively.

Figure 1:
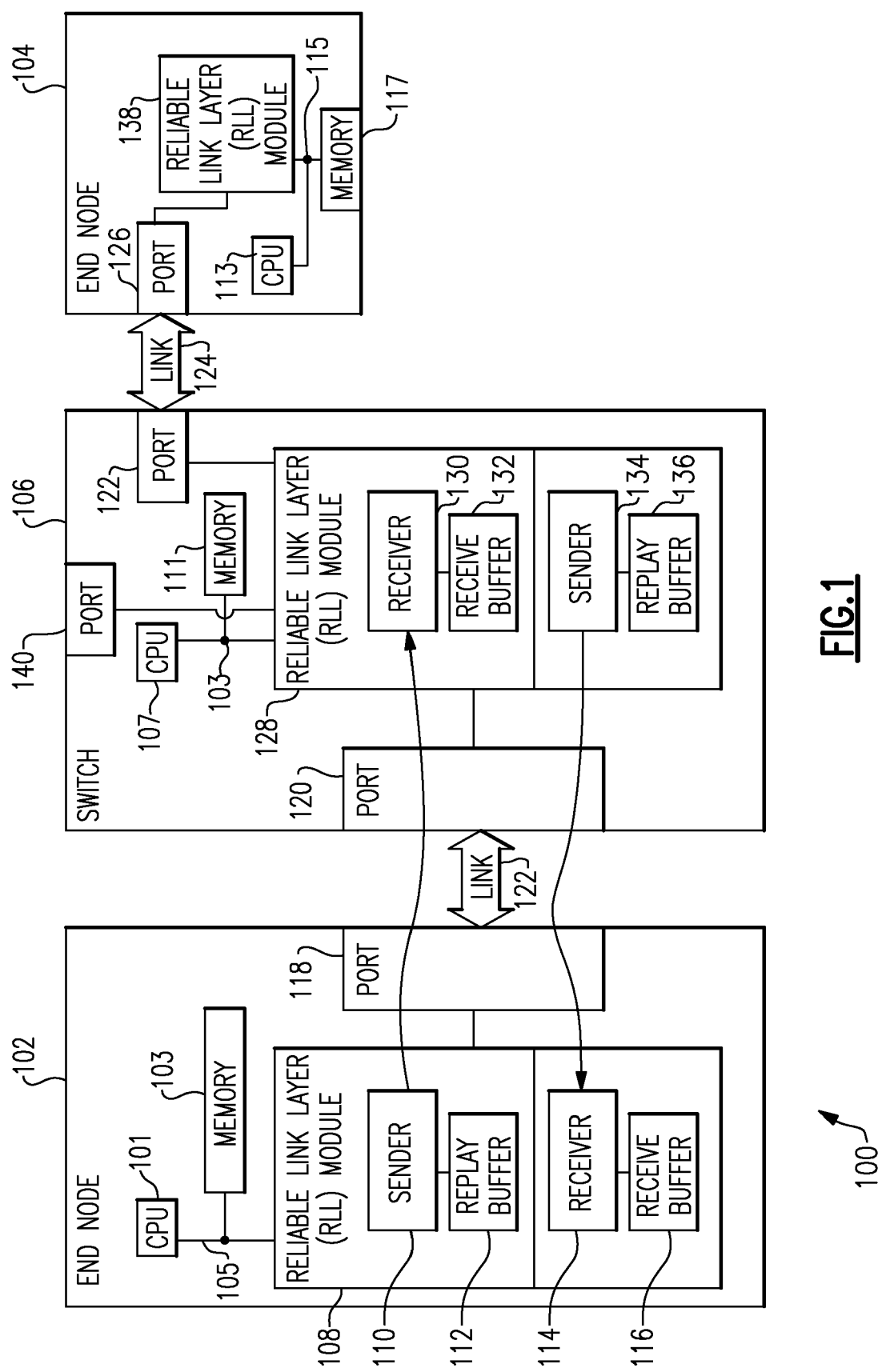
FIG. 1 illustrates an embodiment of a simplified network for use with the techniques of the present invention.

FIG. 1 illustrates an embodiment of a simplified InfiniBand (IB) network 100 for use with the techniques of the present invention. In one embodiment, the network 100 takes the form of a system area network (SAN) comprising a high-bandwidth, low-latency network for interconnecting nodes within a distributed computer system. However, it is appreciated that the techniques of the present invention can be employed on Ethernet or other network or protocol. A node represents any component attached to one or more links of the network and forming the origin and/or destination of messages within the network. The network 100 comprise a first end node 102 coupled to a switched communication switch structure 106 through a first link 122 and a second end node 104 connected to the switch 106 through a second link 124. The end nodes 102, 104 can be in the form of host processor nodes, redundant array disk (RAID) subsystems and I/O chassis nodes. The end nodes 102, 104 are for illustrative purposes, as it will be appreciated, the network 100 can interconnect any type of independent processor nodes, I/O adapter nodes, and I/O device nodes. Any one of the nodes can function as an end node, which is herein defined to be a device that originates or finally consumes messages or packets in the network. In exemplary embodiments, an error handling mechanism in distributed computer systems is present in which the error handling mechanism allows for reliable connection and/or reliable datagram communication between end nodes in distributed computing systems, such as network 100.

A message, as used herein, is an application-defined unit of data exchange, which is a primitive unit of communication between cooperating processes. As discussed below in further detail, a packet is one unit of data encapsulated by networking protocol headers and/or trailers. The headers generally provide control and routing information for directing the packet through network 100. The trailer generally contains control and cyclic redundancy check (CRC) data to verify that packets are not delivered with corrupted contents.

The network 100 depicted in FIG. 1 comprises communications and management infrastructure supporting both I/O and inter-processor communications (IPC) within a distributed computer system. The switched communications switch 106 allows devices to concurrently transfer data with high-bandwidth and low-latency in a secure, remotely managed environment. End nodes can communicate over multiple ports and utilize multiple paths through the network switch. The multiple ports and paths through the network shown in FIG. 1 can be employed for fault tolerance and increased bandwidth data transfers. In another embodiment, instead or in addition to a switch, a fabric can be used which can include a plurality of switches and a router (not shown). A switch is a device that connects multiple links together and allows routing of packets from one link to another link within a subnet using a small header destination local identifier (DLID) field. A router is a device that connects multiple subnets together and is capable of routing packets from one link in a first subnet to another link in a second subnet using a large header destination globally unique identifier (DGUID).

In one embodiment, a link is a full duplex or dual simplex channel between any two network fabric elements, such as end nodes, switches, or routers. Example suitable links include, but are not limited to, copper cables, optical cables, and printed circuit copper traces on backplanes and printed circuit boards.

For reliable service types, end nodes, such as host processor end nodes and I/O adapter end nodes, generate request packets and return acknowledgment packets. Switches and routers pass packets along, from the source to the destination. Except for the Variant CRC trailer field, which is updated at each stage in the network, switches pass the packets along unmodified. Routers update the variant CRC trailer field and modify other fields in the header as the packet is routed.

In one embodiment of the present invention, the network elements comprising end nodes 102, 104 and switch 106 include ports for communicating between the nodes and the switch. For example, end node 102 includes a port 118, end node 104 includes a port 126 and switch 106 includes ports 120, 122 and 140. The ports can be part of a host channel adapter (HCA) or a target channel adapter (TCA) as known in the art. The number of ports shown is for illustrative purposes and it will be appreciated that the network elements can include a different number of ports as required.

The network elements include a reliable link layer (RLL) module in accordance with an embodiment of the present invention. As explained below in further detail, a RLL module provide increases reliability of packet transmission over a network, thereby providing greater network bandwidth because less overhead is required for error handling. For example, in one embodiment, end node 102 includes an RLL module 108 coupled to port 118. The RLL module 108 comprises a sender section including a sender device 110 and a replay buffer 112 which, in combination, is capable of transmitting data packets through the port 118 and link 122 to another network element over the network 100. The RLL module 108 also includes a receiver section comprising a receiver device 114 and receiver buffer 116, which in combination, is capable of receiving data packets and control packets from the port 118 sent over the link 122. The end node 102 also includes a central processing unit (CPU) 101 and a memory 103, both coupled to a bus 105 to allow the components to interact, as well known in the art. The CPU 101 is configured to control/manage the operation of the end node including the operation of the RLL module 108. The memory 103 is configured to store data and program code to support the operation of the end node 102.

The switch 106 includes a RLL module 128 similar to the RLL module 108 of the end node 102. For example, the RLL module 128 comprises a sender section including a sender device 134 and a replay buffer 136, and a receiver section comprising a receiver device 130 and receive buffer 132. The RLL module 128 is coupled to ports 120, 122, 140 and configured to provide similar functionality as the RLL module 108 of end node 102. Likewise, the switch 106 also includes a CPU 107 and a memory 111 coupled, both coupled to each other over a bus 105 to allow the components to interact, as well known in the art. In one embodiment, a separate (dedicated) RLL module is associated with each of ports 120, 122, 140. In another embodiment, the switch 106 is manufactured as one or more application-specific integrated circuits (ASICs) that route packets between ports where they are received into and ports where they are transmitted out. Such an embodiment would include some internal buffering and a relatively small microcontroller for management, but these may be different than the "Memory" and "CPU" in the end nodes.

Likewise, the end node 104 includes an RLL module 138 coupled to port 124 and configured to provide similar functionality as the RLL module 108 of end node 102. The end node 104 includes a CPU 113, a memory 117 and bus 115 and configured to operate in a similar manner as those elements in the switch 106 and end node 102.

In accordance with an embodiment of the present invention, an end node, such as end node 102, can be designated during operation as a data source or a source node for transmitting data packets to a destination node, such as end node 104, through switch 106. The sender device 110 of end node 102 stores data packets in the replay buffer 112 and transmits the data packets to the destination end node. The sender device 110 uses the replay buffer 112 to resend packets in case the link does not acknowledge receipt of the transmitted data packets from the sender device. The size of the replay buffer 112 can be based on various factors such as the amount of storage space the sender device needs to buffer and resend messages. For example, this may require knowledge of maximum round trip times for packets to be processed, sent, received, and processed at the receiving end of the link, and for acknowledgment messages to be returned and processed. With respect to the receiver section, the receiver device 114 handles the receipt of data packets including storing the received packets in the receiver buffer 116. The receiver buffer 116 is sized to buffer a sufficient number of received data packets while the end node is busy attending to other functions such as sending data packets.

In one embodiment, the data packet sent over the link 122 includes a header packet sequence number (PSN) indicating the sequence number of the data packet being transmitted. The PSN is verified as received by a return Acknowledgement (ACK) or not received by a return Negative Acknowledgement (NAK) message from the switch or destination end node. A miscompare of packet sequence numbers, i.e., an out-of-sequence packet, results in the return of a NAK message to the sender device. This may apply to an individual data packet or it may apply to multiple data packets sent since the last ACK message was transmitted. The RLL module is capable of providing "Acknowledgment coalescing" which includes the facility for acknowledging multiple received data packets. In this instance, a sender device interprets an ACK message as indicating successful transmission of the transmitted data packet and data packets previously transmitted having a lower PSN. In addition, an expired time out period in the sender device may also result in a resend condition involving resending the previously sent data packets from the replay buffer.

Figure 2:
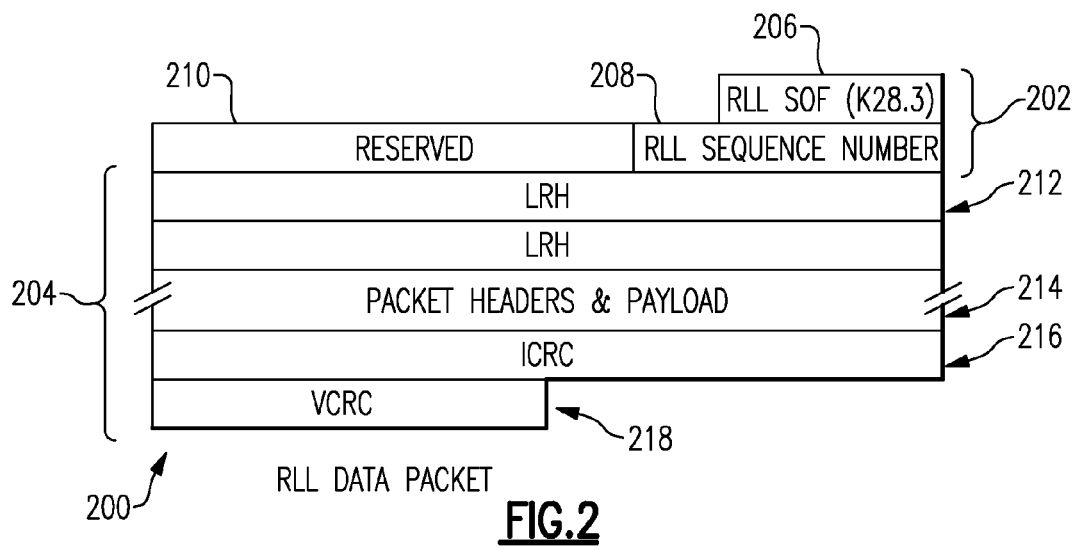
FIG. 2 illustrates a reliable link layer (RLL) data packet format for transmission of data over a network in accordance with an embodiment of the present invention.

FIG. 2 illustrates a Reliable Link Layer (RLL) data packet 200 in accordance with an embodiment of the present invention. The RLL data packet 200 includes an RLL portion 202 appended to a standard IB portion 204.

The RLL portion 202 includes an RLL packet header portion with an RLL start-of-frame (SOF) field 206 (having a length of 1 byte) set to a new K character value (K28.3) (shown in table 500 of FIG. 5). The RLL packet header portion also includes an RLL packet sequence number (PSN) field 208 (having a length of 12 bits) preceded by a reserved field 210 (having length of 12 bits).

The standard IB portion 204 includes a Local Routing Header (LRH) 212 (having a length of 8 bytes). The standard IB portion also includes a packet header and payload section 214, well known in the art. In addition, the standard IB portion 204 includes an invariant cyclic redundancy code (ICRC) calculation field 216 which is a cyclic redundancy code generated by a source node and a destination node to verify packet reception. The standard IB portion 204 further includes a Variant CRC (VCRC) calculation field 218 which is another cyclic redundancy code recalculated at each switch or router hop of fabrics across the entire transmission path.

In contrast to the format of the present application, the format of a conventional data packet includes an SOF field which is specific to the IB protocol and uses a particular 10 bit symbol (8 bit/10 bit encoding) indicating a SOF. In one embodiment of the present invention, the 10 bit symbol is replaced with the RLL SOF field 206 indicating that the packet is an RLL packet that can be recovered or retried over a link using the methods of the present invention.

Figure 3:
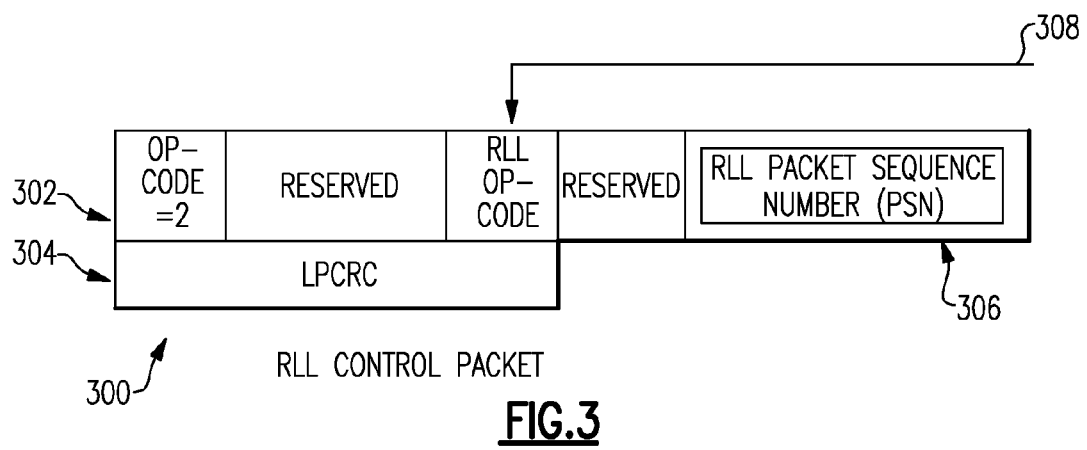
FIG. 3 illustrates an RLL control packet for transmission of data over a network in accordance with another embodiment of the present invention.

FIG. 3 illustrates an RLL control packet 300 in accordance with an embodiment of the present invention. The RLL flow control packet (also referred to as a "link control" packet) 300 can be used in combination with the RLL data packet 200, as described above. For example, the RLL data packet 200 can be transmitted to a receiver and the receiver can respond with control packet 300 over a link acknowledging receipt of the data packet. The RLL control packet 300 includes an operations code (Op-Code) field 302 that can be set to one of three values.

For standard or regular IB traffic, the Op-Code field 302 is set to a value of "0" or "1", as well known in the art. In accordance with an embodiment of the present invention, the Op-Code field 302 is set to a third value of "2" indicating that the control packet is an RLL control packet type of message. The RLL control packet 300 also includes an RLL Op-Code field 308 further defining the type of RLL message being sent. For example, to send an Acknowledgment (ACK) message, indicating that the PSN of the received data packet was equal to the expected PSN, a receiver sets the RLL Op-Code field 308 to a value of "0." On the other hand, to send a Negative Acknowledgment (NAK) message, indicating that the PSN of the received data packet was not equal to the expected PSN, a receiver sets the RLL Op-Code field 308 to a value of "1". Finally, a receiver can send an Initialization (INIT) message to the sender to initialize the value of the PSN of the data packet that the sender should send in the next transmission. In this case, the receiver sets the RLL Op-Code field 308 to a value of "2". The RLL control packet 300 includes an RLL packet sequence number (PSN) field 306 which indicates the packet sequence number of the data packet received by the receiver. The RLL control packet 300 also includes a Link Packet Cyclic Redundancy Check (LPCRC) field 304 which provides a cyclic redundancy check for the control packet.

Figure 4:
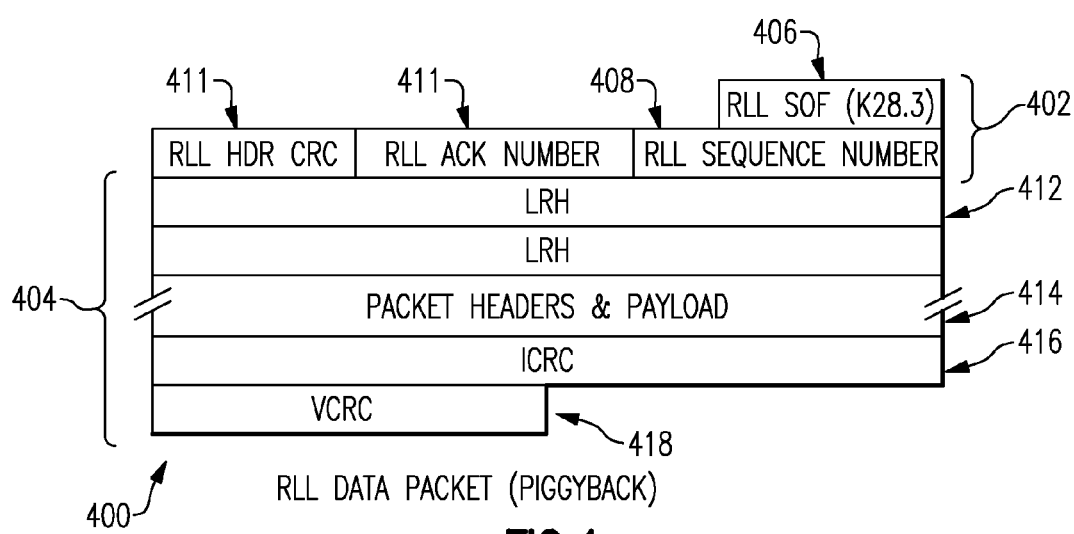
FIG. 4 illustrates an RLL data packet for transmission of control information over a network in accordance with an embodiment of the present invention.

FIG. 4 illustrates an RLL data packet 400 in accordance with another embodiment of the present invention. The RLL data packet 400 is similar to the RLL data packet 200 shown in FIG. 2 and described above. For example, the RLL data packet 400 includes an RLL portion 402 and a standard IB portion 404.

The standard portion 404 includes standard fields (412, 414, 416 and 418) similar to the fields of the standard portion of packet 202. Likewise, the RLL portion 402 includes an RLL SOF field 406 and RLL sequence number. However, in contrast to the RLL portion 202 of packet 200 above, the RLL portion 402 includes an RLL Acknowledgment (ACK) number field 410 to provide a "piggyback" acknowledgment function, as explained below. In addition, an RLL header (HDR) CRC field 411 provides a cyclic redundancy check function for the field 410. The fields 410, 411 replace the reserved field 210 of the packet 200 (FIG. 2) so the packet 400 can be used to describe both the sequence number of the current packet and to simultaneously acknowledge a packet that was sent the other way. In this embodiment, if data packets are flowing in both directions on a link, the RLL capability for adding sequence numbers to packets, and acknowledging intact packet reception may be implemented without use of control packets. In another embodiment, if no data packets are being sent on which to piggyback acknowledgments, then Acknowledgement and/or Negative Acknowledgement messages using control packet 300 (FIG. 3) would be used.

FIG. 5 illustrates a table defining "K" characters for use in an embodiment of the present invention. The table 500 provides Symbols 502, Encoding values 504 of the symbols and corresponding Description 506. The table lists twelve encoded link control symbols using 8 B/10 B encoding, the first seven of which are defined IB control characters. These "K" characters are 10 bit symbols used for special purposes, as indicated by Description 506. In one embodiment of the present invention, the character "K" character K28.3, designated by arrow 508, is used as the RLL SOF character defined above symbolized as "SRP" (Start of Reliable Packet).

The application of the techniques described above is now illustrated in flowchart form with respect to processes for sending RLL data packets from a sender to a receiver device over an InfiniBand (IB) network. To illustrate, and for ease of explanation of the process, referring to FIG. 1, it will be assumed that end node 102 sends RLL data packets to end node 104, through switch 106, intended for end node 104. The process below will be described in the context of the RLL module 108 of end node 102 communicating with the RLL module 128 of switch 106 over link 122. It will be further assumed that sender 110 (hereinafter, source sender) transmits RLL data packets to receiver 130 (hereinafter, destination receiver). It will be further assumed that the sender 134 (hereinafter, destination sender) can acknowledge receipt of such data packets via transmission of RLL control packets and/or RLL data packets to the receiver 114 (hereinafter, source receiver). It will be appreciated that the operation of the end node 104 and the switch 106 is similar to the operation of the end node 102 and the switch and will be not be described.

Figure 6:
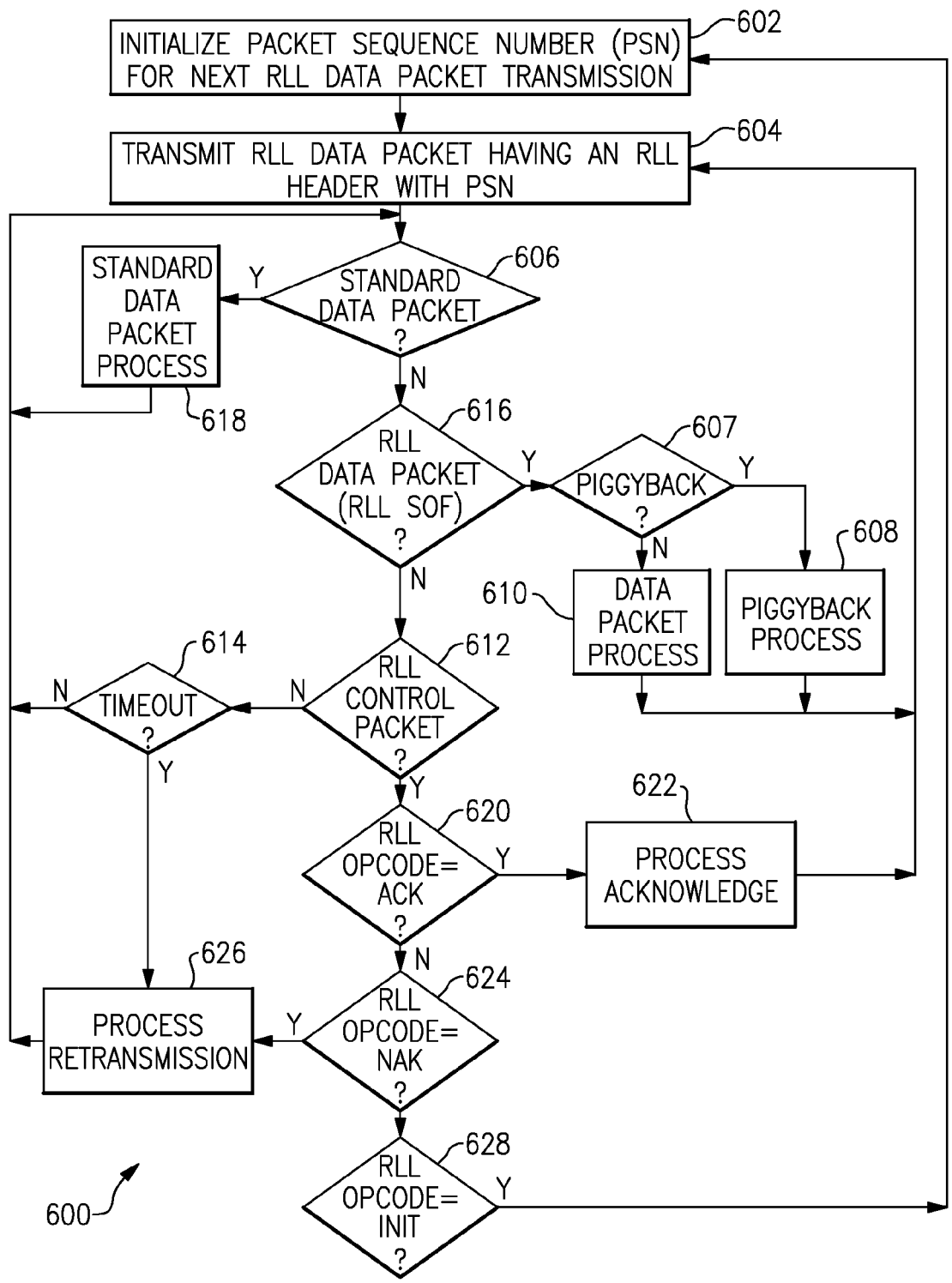
FIG. 6 illustrates a flow diagram of a process for sending data packets over a network in accordance with an embodiment of the present invention.
Figure 7:
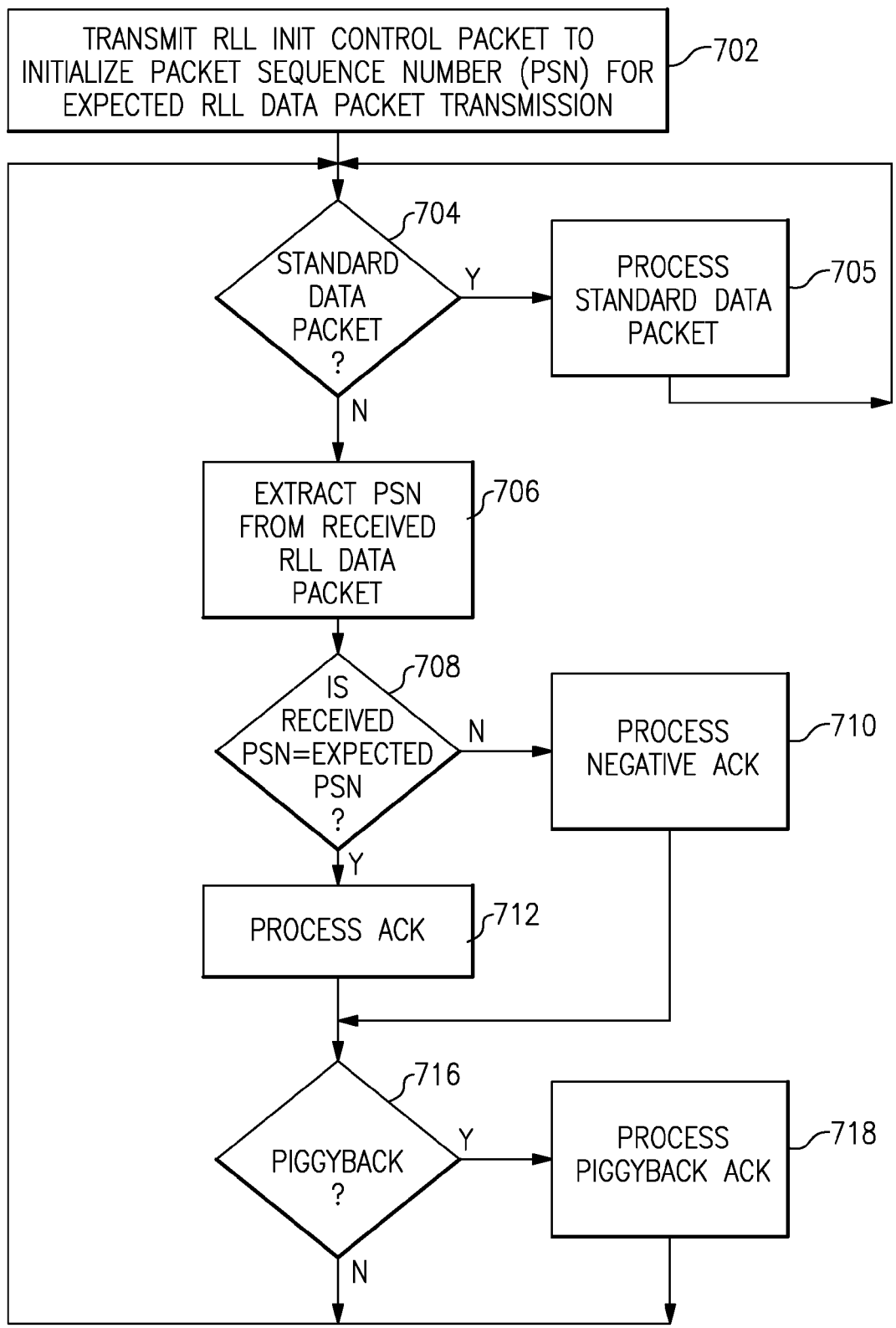
FIG. 7 illustrates a flow diagram of a process for receiving data packets over a network in accordance with an embodiment of the present invention.

The flow chart 600 of FIG. 6 shows a process of a sending data to a receiver (switch 106) from the perspective of the sender (end node 102). On the other hand, FIG. 7 is flow chart 700 which shows the process of a receiving data from the sender, from the perspective of the receiver (switch 106).

Turning to FIG. 6, as part of an initialization process (step 602), the source receiver 114 receives an RLL control packet, such as packet 300 shown in FIG. 3, with PSN initialization information from the destination sender 134. In one embodiment, the RLL control packet is an Initialization RLL control packet (INIT) with the RLL Op-Code field 308 set to "2" and the RLL PSN field 306 set to the PSN that the destination receiver 130 expects to receive in the next RLL data packet transmitted from the source sender 110 to the destination receiver. Once the source sender 110 receives this packet, it uses the received PSN value to transmit subsequent data packets to the destination receiver. This process allows the synchronization of the transmission of data packets between the source sender and destination receiver.

The source sender 110 then builds (step 604) an RLL data packet, such as RLL data packet 200 shown in FIG. 2, for transmission to the destination receiver 130 over the link 122. In one embodiment, the source sender builds (forms) the RLL data packet by appending or adding the RLL header portion 202 including the RLL SOF field 206 and RLL PSN field 208 to the standard IB portion 204. The source sender 110 sets the RLL PSN field 208 to the PSN previously received during the initialization process (step 602) described above. The source sender 110 then transmits the RLL data packet. The source sender stores a copy of the RLL data packet in its replay buffer 112 in case the sender needs to retransmit the data packet if there is no acknowledgment (ACK) of receipt of the data packet, as explained below.

Once the source sender 110 transmits the RLL data packet, the source receiver 114 checks (step 606) for receipt of a standard data packet (packet not having an RLL SOF), RLL data packet or an RLL control packet from the destination sender 134. If the source receiver 114 receives a standard data packet, then the receiver executes a standard packet process 618 in which the data packet is processed according to well known techniques, such as, for example, processing the payload and header portion of the data packet.

On the other hand, if the source receiver is not in receipt of a standard data packet, then it checks (step 616) for receipt of a RLL data packet. If the source receiver 114 is in receipt of an RLL data packet (RLL SOF), then it proceeds to check (step 607) whether it is configured to operate in the "piggyback" mode. Such mode provides for acknowledgement of data packets contained in the RLL data packet (for example, packet 400 shown in FIG. 4) instead of in a RLL control packet (for example, packet 300). If the source sender 110 is set to the "piggyback" mode, then the received RLL data packet is processed according to a "piggyback" process (step 608) which includes extracting the RLL ACK number field 410 from the packet 400 (FIG. 4). The RLL ACK number field 410 indicates the PSN of the last data packet received by the destination receiver 130. The source receiver 114 may also process the RLL data packet by processing the contents (e.g., payload) of the standard IB portion 404 of the data packet 400. The process also includes purging the contents of the replay buffer of the sender buffer and allow the sender to proceed to transmit subsequent data packets, as it proceeds back to step 604. On the other hand, if the source sender 110 is not configured in the "piggyback" mode, then the received RLL data packet (e.g., data packet 200 of FIG. 2) is processed according to the RLL data packet process (step 610) which may include storing the data packet in the receive buffer 116 of the source receiver 114. In one embodiment, the sender can form a second RLL packet comprising a second RLL header and the received data packet, and then transmit the second RLL packet to a further port over the network. The process then returns to check (step 606) for receipt of subsequent data packets from the destination sender 134. If the source receiver 114 is not in receipt of an RLL data packet (step 616), the receiver proceeds to check for receipt (step 612) of an RLL control packet, such as RLL control packet 300 shown in FIG. 3, in response to the previous transmission of the data packet described above (step 604). That is, the source receiver first checks if the RLL Op-Code field 302 of the control packet is set to the value of "2" indicating an RLL control packet. If the source receiver 114 is not in receipt of an RLL control packet, then the receiver proceeds to check (step 614) if a timeout period has expired since the transmission of the RLL data packet (step 604). The timeout period can be static or dynamic and based on the characteristics of the link or other criteria. If the timeout period has expired, then the source sender 110 performs a retransmit process (step 626). In one embodiment, the retransmit process may include retransmitting one or more data packets previously transmitted and stored in the replay buffer of the sender. On the other hand, if the time out period (step 614) has not expired, processing proceeds to step 606 in which the source sender 110 continues to monitor the link for receipt of RLL data packets.

If the source receiver 114 determines (step 612) that the control packet is an RLL control packet, then the receiver proceeds to check (step 620) whether the RLL control packet is an Acknowledgement (ACK) control packet as indicated by the RLL Op-Code field 308 being set to a value of "0." If the RLL control packet is an Acknowledgement control packet, then the source receiver proceeds to execute an acknowledgment process (step 622). The Acknowledgement control packet indicates that the destination receiver 130 correctly received the data packet indicated in the RLL PSN field 306 of the data packet previously transmitted. In one embodiment, the acknowledgment process 622 involves checking the RLL PSN field 306 and determining which RLL data packets to purge from the replay buffer of the source sender to make space for new RLL data packets to be transmitted in the next transmission process performed in step 604. In addition, if the source sender is configured to operate in an "acknowledgment" coalescing mode, then the sender interprets the PSN value from the RLL PSN field 306 as indicating receipt of data packets having that PSN and lower. Thus, data packets below and including the PSN can be purged from the replay buffer. This technique provides for receipt acknowledgment for multiple data packets.

On the other hand, if the source receiver 114 determines (step 620) that the RLL control packet is not an Acknowledgement (ACK) packet, then the source receiver checks (step 624) whether the RLL control packet is a Negative Acknowledgement (NAK) packet, such as packet 300 of FIG. 3, indicated by the RLL Op-Code field 308 being set to a value of "1." The Negative Acknowledgement packet indicates that the destination receiver 130 did not receive the data packet indicated in the RLL PSN field 306. If the RLL control packet is a Negative Acknowledgement packet, then the receiver proceeds to execute the retransmission process 626, as explained above.

On the other hand, if the RLL control packet is not a Negative Acknowledgement (NAK) packet, then the source receiver 114 checks (step 628) whether the RLL control packet is an Initialization (INIT) control packet indicated by the RLL Op-Code field 308 being set to a value of "2." If the RLL control packet is equal to an Initialization packet, then the source sender proceeds to execute the initialization process (step 602) described above. On the other hand, if the RLL control packet is not a Negative Acknowledgement (NAK) packet, then the process proceeds to step 606 to monitor or check or receipt of data and/or control packets.

Turning to FIG. 7, to illustrate, referring to FIG. 1, it will be assumed that end node 102 sends RLL data packets to end node 104 through switch 106. The process below will be described in the context of the first RLL module 108 of end node 102 communicating with the second RLL module 128 of switch 106 over link 122. It will be further assumed that sender 110 (source sender) transmits RLL data packets to receiver 130 (destination receiver). It will be further assumed that the sender 134 (destination sender) can acknowledge receipt of such data packets via transmission of RLL data packets and/or RLL control packets to the receiver 114 (source receiver). It will be appreciated that the operation of the end node 104 and the switch 106 is similar to the operation of the end node 102 and the switch and will be not be described.

As part of an initialization process (step 702), the destination sender 134 sends to the source receiver 114 an RLL control packet, such as packet 300 shown in FIG. 3, with PSN initialization information. In one embodiment, the RLL control packet is an Initialization RLL control packet (INIT) with the RLL Op-Code field 308 set to the value "2" and the RLL PSN field 306 set to the PSN that the destination receiver 130 expects to receive in the next RLL data packet transmitted from the source sender 110 to the destination receiver. As explained previously, the source sender 110 uses the received PSN to build an RLL data packet, such as RLL data packet 200 shown in FIG. 2, for transmission to the destination receiver 130 over the link 122. The source sender 110 sets the RLL PSN field 208 to the PSN received during the initialization process (step 702) described above. The source sender 110 then transmits the RLL data packet and stores a copy of the RLL data packet in its replay buffer 112 in case it needs to retransmit the data packet if does not receive acknowledgment of the data packet.

Once the destination sender 134 sends the RLL Initialization RLL control packet (step 702), the destination receiver 130 checks (step 704) for receipt of packets including standard (non-RLL) data packets and RLL data packets from the source sender 110. If the destination receiver 130 is in receipt of a standard data packet, then the receiver executes a standard data packet process 705. Such a process includes well known techniques for processing standard data packets including processing the payload and header portions of such data packets. On the other hand, if the destination receiver is not in receipt of standard data packet, then it assumes it is in receipt of an RLL data packet, such as data packet 200 shown in FIG. 2, in which case, it proceeds (step 706) to extract the PSN value from the RLL PSN field 208 of the received data packet 200. The destination receiver 130 proceeds (step 708) to compare the extracted PSN value from the received data packet to the expected PSN it had sent previously (step 702). If the value of the received PSN is not equal to the expected PSN then this constitutes an error condition. Accordingly, the destination sender 134 proceeds (step 710) to transmit a RLL control packet in the form of a Negative Acknowledgement (NAK) packet, such as packet 300 of FIG. 3, indicated by the RLL Op-Code field 308 being set to a value of "1." The Negative Acknowledgement packet indicates that the destination receiver 130 did not receive the data packet indicated in the RLL PSN field. Once the control packet has been sent, the destination receiver 130 waits (step 704) for receipt of further data or control packets from the source sender.

On the other hand, if the value of the received PSN is equal to the expected PSN, then the sender 134 executes an acknowledgement process (step 712) indicating that the receiver has successfully received the expected data packet. For example, in one embodiment, the destination sender generates an RLL control packet in the form of an Acknowledgement control packet (ACK), such as packet 300 shown in FIG. 3, as indicated by the RLL Op-Code field 308 being set to a value of "0." In addition, the RLL PSN field 306 is set to the received PSN of the received data packet. Furthermore, as part of process 712, the destination receiver stores the received data packet in the receive buffer 132 for further processing. Such further processing can include, for example, forwarding the data packet to another node over a link or processing the data packet itself.

Then the destination receiver checks (step 716) for receipt of a "piggyback" data packet such as packet 400 shown in FIG. 4. If receipt of such a "piggyback" data packet is received, then the "piggyback" acknowledge process (step 718) is executed. Such process can include, extracting the contents (e.g., payload) of the standard IB portion 404 of the data packet 400. In addition, the PSN 408 is extracted and processing in a similar manner as in steps 708, 710 and 712. That is the extracted PSN is compared to the expected PSN. If they are equal, then an ACK process (similar to step 712) is executed, otherwise, a NAK process (similar to step 710) is executed. In addition, the process of step 718 can include extracting the RLL number field 410 from the packet 400. The RLL number field 410 indicates the PSN of the last data packet received by the source receiver 114.

As explained above, the use of such "piggyback" techniques may have various advantages. For example, the fields 410, 411 are used to describe both the sequence number of the current packet and to simultaneously acknowledge a packet that was sent the other way. In this embodiment, if data packets are flowing in both directions on a link, the RLL capability for adding sequence numbers to packets, and acknowledging intact packet reception may be implemented without use of control packets. In another embodiment, if no data packets are being sent on which to piggyback acknowledgments, then Acknowledgement and/or Negative Acknowledgement messages using control packet 300 (FIG. 3) would be used.

On the other hand, if no RLL data packet is received (step 716) from the source sender, then the destination receiver proceeds back to step 704 and waits for the arrival of standard or RLL data packets or control packets.

In some embodiments, the above techniques may provide various advantages. For example, such techniques may help reduce the effects of errors on each link (point to point) rather than undertaking an end to end post mortem in its entirety. One advantage of the presently disclosed approach is that the original source is not sending messages to many destinations, from the perspective of a single link, because there is only one source (sending end) and one destination (receiving end) on each link, providing easy record keeping and quick recovery. Each link can thus be managed effectively error free from the perspective of the end nodes. For example, each link can be made more reliable by using a retry function. If a packet is corrupted while traversing a link then the receiver on that link can notify the sender, via a timeout or a NAK, and the sender can then retransmit the packet on that link. The sender can avoid premature time outs because the time out periods can be dramatically increased and false retries minimized.

Figure 8:
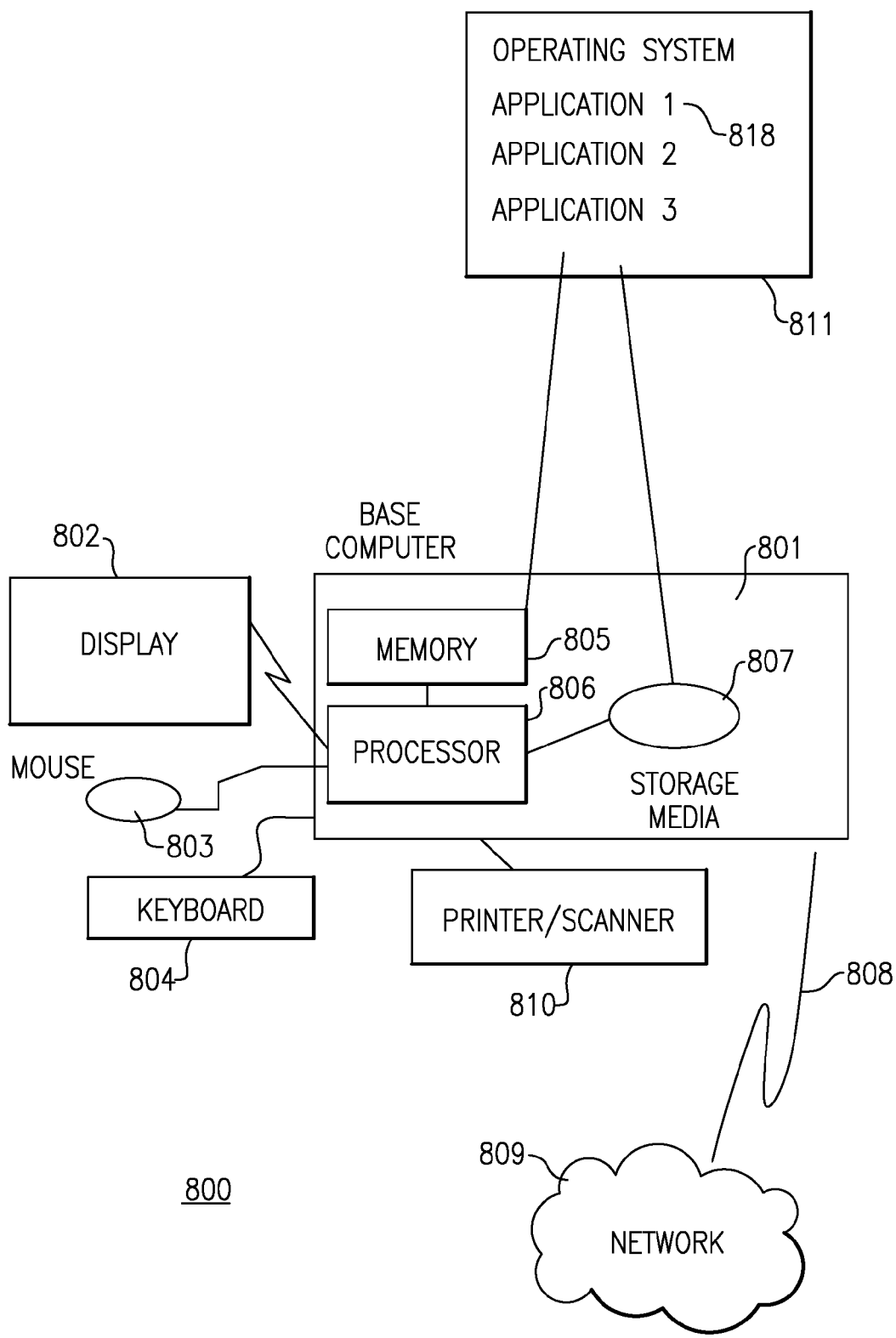
FIG. 8 illustrates an embodiment of a computer system in which the techniques of the present invention may be practiced.

FIG. 8 illustrates a representative workstation or server hardware system 800 in which the present invention may be practiced. The system 800 comprises a representative computer system 801, such as a personal computer, a workstation or a server, including optional peripheral devices. The computer 801 includes one or more processors 806 and a bus employed to connect and enable communication between the processor(s) 806 and the other components of the computer 801 in accordance with known techniques. The bus connects the processor 806 to memory 805 and long-term storage 807 which can include a hard drive, diskette drive or tape drive for example. The computer 801 might also include a user interface adapter, which connects the processor 806 via the bus to one or more interface devices, such as a keyboard 804, mouse 803, a printer/scanner 810 and/or other interface devices, which can be any user interface device, such as a touch sensitive screen, digitized entry pad, etc. The bus also connects a display device 802, such as an LCD screen or monitor, to the processor 806 via a display adapter.

The computer 801 may communicate with other computers or networks of computers by way of a network adapter capable of communicating 808 with a network 809. Example network adapters are communications channels, token ring, Ethernet or modems. Alternatively, the computer 801 may communicate using a wireless interface, such as a CDPD (cellular digital packet data) card. The computer 801 may be associated with such other computers in a Local Area Network (LAN) or a Wide Area Network (WAN), or the computer 801 can be a client in a client/server arrangement with another computer, etc. All of these configurations, as well as the appropriate communications hardware and software, are known in the art.

Figure 9:
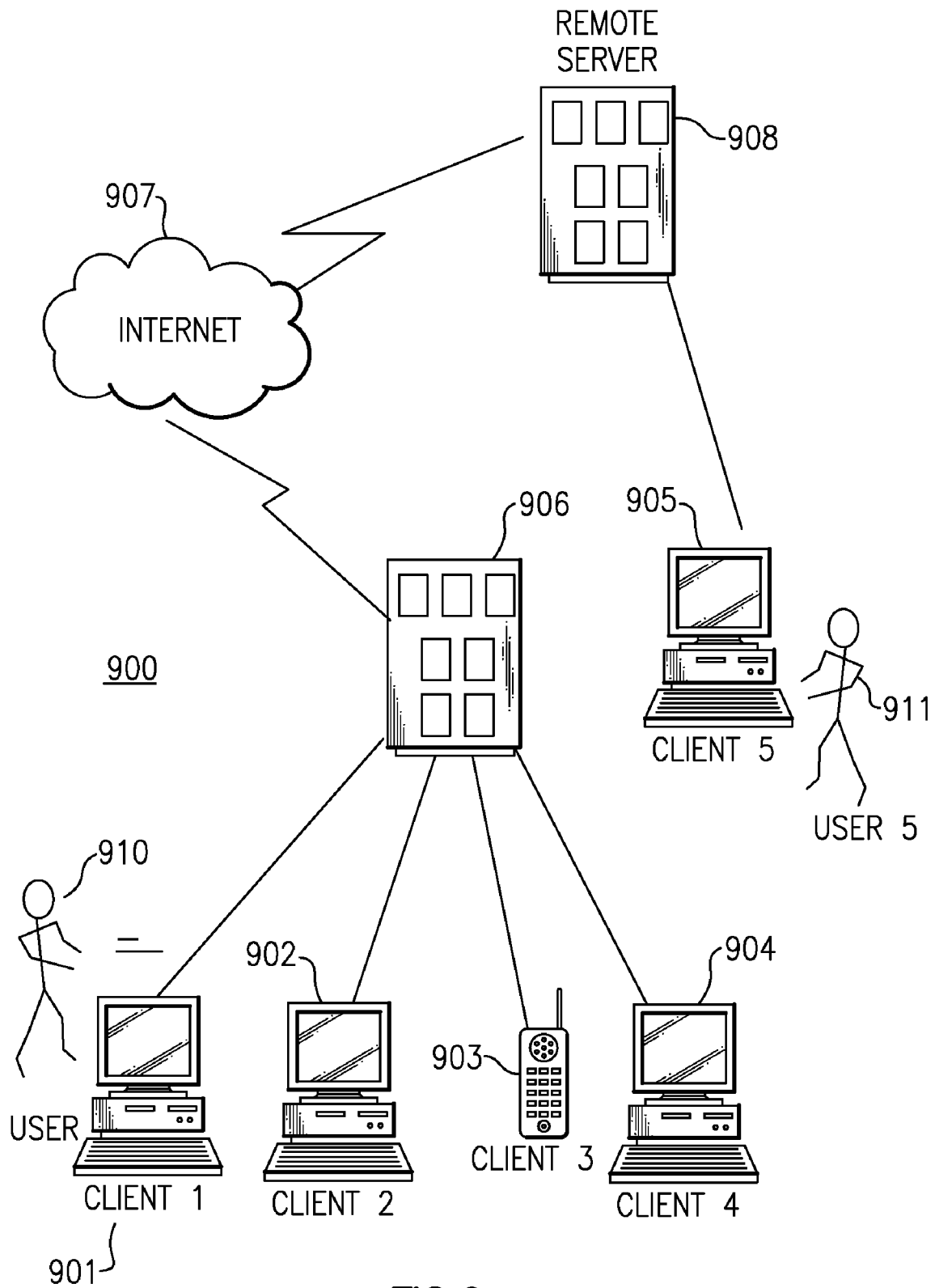
FIG. 9 illustrates an embodiment of a data processing network in which the techniques of the present invention may be practiced.

FIG. 9 illustrates a data processing network 900 in which the present invention may be practiced. The data processing network 900 may include a plurality of individual networks, such as a wireless network and a wired network, each of which may include a plurality of individual workstations 901, 902, 903, 904. Additionally, as those skilled in the art will appreciate, one or more LANs may be included, where a LAN may comprise a plurality of intelligent workstations coupled to a host processor.

Still referring to FIG. 9, the networks may also include mainframe computers or servers, such as a gateway computer (client server 906) or application server (remote server 908 which may access a data repository and may also be accessed directly from a workstation 905). A gateway computer 906 serves as a point of entry into each network 907. A gateway is needed when connecting one networking protocol to another. The gateway 906 may be preferably coupled to another network (the Internet 907 for example) by means of a communications link. The gateway 906 may also be directly coupled to one or more workstations 901, 902, 903, 904 using a communications link. The gateway computer may be implemented utilizing an IBM eServer zSeries® Server available from IBM Corp.

Turning to FIG. 8, software programming code which embodies the present invention is typically accessed by the processor 806 of the computer 801 from long-term storage media 807, such as a CD-ROM drive or hard drive. The software programming code may be embodied on any of a variety of known media for use with a data processing system, such as a diskette, hard drive, or CD-ROM. The code may be distributed on such media, or may be distributed to users 910, 911 (FIG. 9) from the memory or storage of one computer system over a network to other computer systems for use by users of such other systems.

Alternatively, the programming code may be embodied in memory 805, and accessed by the processor 806 using the processor bus. Such programming code includes an operating system 811 which controls the function and interaction of the various computer components and one or more application programs 818. Program code is normally paged from dense storage media 807 to high-speed memory 805 where it is available for processing by the processor 806. The techniques and methods for embodying software programming code in memory, on physical media, and/or distributing software code via networks are well known and will not be further discussed herein.

Alternative Embodiments

It should be noted that the present invention, or aspects of the invention, can be embodied in a computer program product, which comprises features enabling the implementation of methods described herein, and which, when loaded in a host computer system or in an adapter, is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form. For the purposes of this description, a computer program product or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

Devices described herein that are in communication with each other need not be in continuous communication with each other, unless expressly specified otherwise. In addition, devices that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article. The functionality and/or the features of a device may be alternatively be embodied by one or more other devices which are not explicitly described as having such functionality/features. Thus, other embodiments need not include the device itself.

Therefore, the foregoing description of the embodiments has been presented for the purposes of illustration and description. It is not intended to be exhaustive or to limit the embodiments to the precise form disclosed. Many modifications and variations are possible in light of the above teaching.

What is claimed is:

1. A method for communicating over a computer network having a first port with a point-to-point link connection to a second port, the method comprising:
   the first port storing in a buffer, a first data packet to be transmitted, the first data packet comprising a first packet header, and a first packet payload;
   the first port, transmitting to the second port from the buffer a first reliable link layer (RLL) packet over the link, the first RLL packet comprising a first RLL header and the first data packet, the first RLL header preceding the first data packet, the first RLL header comprising an RLL start-of-frame (SOF) character and an RLL packet sequence number (PSN);
   if the first port receives an RLL acknowledgment control packet from the link, acknowledging receipt of the first data packet, the first port not retaining the first data packet in the buffer, the RLL acknowledgement control packet comprising: an op-code field for defining the type of RLL message being sent and the RLL PSN; and
   if the first port does not receive the RLL acknowledgment packet from the link, acknowledging receipt of the first data packet, the first port re-transmitting from the buffer the first data packet.

2. The method of claim 1, further comprising the first port transmitting over the link a data packet without an RLL SOF and RLL PSN.

3. The method of claim 1, wherein if the RLL acknowledgment control packet is not received from the second port within a predetermined time period, the first port re-transmitting from the buffer the first data packet.

4. The method of claim 1, wherein if the RLL acknowledgment control packet includes a received packet sequence number (PSN), the first port discarding data packets in the buffer corresponding to packets specified by the received PSN sequence number and any packets specified by a previous PSN.

5. The method of claim 1, further comprising:
   receiving a second RLL packet from the second port, the second RLL packet comprising a second RLL header preceding a second data packet;
   forming a third packet comprising the second RLL packet without the second RLL header; and
   transmitting the third packet to a third port over the network.

6. The method of claim 1, further comprising receiving from the second port a second RLL packet, the second RLL packet comprising a second RLL header and second data packet, wherein the second RLL header includes a PSN specifying a packet previously received by the second port.

7. An apparatus comprising a first port adapted to communicate over a computer network with a point-to-point link connection to a second port, the first port configured to:
   store a first data packet to be transmitted to the second port, the first data packet comprising a first packet header, and a first packet payload,
   transmit to the second port from the buffer a first reliable link layer (RLL) packet over the link, the first RLL packet comprising a first RLL header and the first data packet, the first RLL header preceding the first data packet, the first RLL header comprising an RLL start-of-frame (SOF) character and an RLL packet sequence number (PSN),
   if the first port receives an RLL acknowledgment control packet from the link, acknowledge receipt of the first data packet, the first port does not retain the first data packet in the buffer, the RLL acknowledgement control packet comprising: an op-code field for defining the type of RLL message being sent and the RLL PSN, and
   if the first port does not receive the RLL acknowledgment packet from the link, acknowledge receipt of the first data packet, the first port does not re-transmit from the buffer the first data packet.

8. The apparatus of claim 7, wherein the first port is configured to transmit over the link a data packet without an RLL SOF and RLL PSN.

9. The apparatus of claim 7, wherein if the RLL acknowledgment control packet is not received from the second port within a predetermined time period, the first port is configured to re-transmit from the buffer the first data packet.

10. The apparatus of claim 7, wherein if the RLL acknowledgment control packet includes a received packet sequence number (PSN), the first port is configured to discard data packets in the buffer corresponding to packets specified by the received PSN sequence number and any packets specified by a previous PSN.

11. The apparatus of claim 7, wherein the first port is configured to receive from the second port a second RLL packet, the second RLL packet comprising a second RLL header and second data packet, wherein the second RLL header includes a PSN specifying a packet previously received by the second port.

12. A computer program product for communicating over a network, comprising a non-transitory computer readable medium having a computer readable program, wherein the computer readable program when executed on a computer causes the computer to:
   store in a buffer of a first port, a first data packet to be transmitted, the first data packet comprising a first packet header, and a first packet payload;
   transmit from the buffer of the first port a first reliable link layer (RLL) packet over the link, the first RLL packet comprising a first RLL header and the first data packet, the first RLL header preceding the first data packet, the first RLL header comprising an RLL start-of-frame (SOF) character and an RLL packet sequence number (PSN);
   if the first port receives an RLL acknowledgment control packet from the link, acknowledge receipt of the first data packet, the first port to not retain the first data packet in the buffer, the RLL acknowledgement control packet comprising: an op-code field for defining the type of RLL message being sent and the RLL PSN; and
   if the first port does not receive the RLL acknowledgment packet from the link, acknowledge receipt of the first data packet, re-transmit from the buffer the first data packet.

13. The computer program product of claim 12, wherein the non-transitory computer readable medium further includes instructions that, when executed on a program, cause the computer to:
   transmit from the first port over the link a data packet without an RLL SOF and RLL PSN.

14. The computer program product of claim 12, wherein the non-transitory computer readable medium further includes instructions that, when executed on a program, cause the computer to:

wherein if the RLL acknowledgment control packet is not received from the second port within a predetermined time period, retransmit from the buffer the first data packet.

15. The computer program product of claim 12, wherein the non-transitory computer readable medium further includes instructions that, when executed on a program, cause the computer to:

wherein if the RLL acknowledgment control packet includes a received packet sequence number (PSN), discard data packets in the buffer corresponding to packets specified by the received PSN sequence number and any packets specified by a previous PSN.

16. The computer program product of claim 12, wherein the non-transitory computer readable medium further includes instructions that, when executed on a program, cause the computer to:

check for receipt of an acknowledgment control packet not having an RLL SOF character.

17. The computer program product of claim 12, wherein the non-transitory computer readable medium further includes instructions that, when executed on a program, cause the computer to:

receive a second RLL packet from the second port, the second RLL packet comprising a second RLL header preceding a second data packet; form a third packet comprising the second RLL packet without the second RLL header; and transmit the third packet to a third port over the network.

18. The computer program product of claim 12, wherein the non-transitory computer readable medium further includes instructions that, when executed on a program, cause the computer to:

receive from the second port a second RLL packet, the second RLL packet comprising a second RLL header and second data packet, wherein the second RLL header includes a PSN specifying a packet previously received by the second port.

19. The computer program product of claim 12, wherein the non-transitory computer readable medium further includes instructions that, when executed on a program, cause the computer to:

receive from the second port a second RLL packet, the second RLL packet comprising a second RLL header and second data packet, wherein the second RLL header includes a second PSN specifying the second data packet; and compare the second PSN with an third PSN representing an expected PSN of the second data packet.

* * * * *